US012736173B2

(12) United States Patent
Roysum

(10) Patent No.: US 12,736,173 B2
(45) Date of Patent: Sep. 15, 2026

(54) KLING-ON TRIPOD MOUNTING DEVICE

(71) Applicant: Ronald Roysum, Hopland, CA (US)

(72) Inventor: Ronald Roysum, Hopland, CA (US)

( * ) Notice: Subject to any disclaimer, the term of this patent is extended or adjusted under 35 U.S.C. 154(b) by 63 days.

(21) Appl. No.: 18/960,956

(22) Filed: Nov. 26, 2024

(65) Prior Publication Data

US 2026/0146705 A1 May 28, 2026

(51) Int. Cl.
*F16M 11/36* (2006.01)

(52) U.S. Cl.
CPC .................................... *F16M 11/36* (2013.01)

(58) Field of Classification Search
CPC . F16M 11/36; A62B 35/0043; A62B 35/0068; E04G 21/3214; E04G 21/3223; E04G 21/3233; A47B 91/00
USPC ..... 248/188.8, 188.9, 545, 530, 85, 87, 156, 248/188
See application file for complete search history.

(56) References Cited

U.S. PATENT DOCUMENTS 1,661,930 A * 3/1928 Dietrich .................. E04H 12/00 52/645
1,672,596 A * 6/1928 Zerk ...................... F16M 11/36 248/188.8
2,277,939 A * 3/1942 Thalhammer ........ F16M 11/247 248/351
2,668,682 A * 2/1954 Dalton ................... F16M 11/34 396/428
3,570,130 A * 3/1971 Boehm .................. F16M 11/26 248/173
3,655,160 A * 4/1972 Grillot ................... A63B 71/02 403/68
3,745,879 A * 7/1973 Asikainen ............... F41A 27/06 89/37.05
3,920,207 A * 11/1975 Adamaitis .............. A01K 97/10 224/907
4,143,446 A * 3/1979 Down ..................... F16G 11/06 403/312
4,192,076 A * 3/1980 Hall ........................ G01P 15/08 248/524
4,208,946 A * 6/1980 Van Sickle ............. F41A 23/12 89/37.04
4,290,207 A * 9/1981 Browning ............ F16M 11/046 33/295
4,940,203 A * 7/1990 Hayakawa ........... F16M 11/247 135/84
4,942,943 A * 7/1990 Flaherty ................. A62B 35/04 248/539

(Continued)

*Primary Examiner* — Terrell L Mckinnon
*Assistant Examiner* — Asa Franklin Solomon

(57) ABSTRACT

A tripod support device is described. The tripod support device attaches to a leg of a tripod. The device comprises a cylinder body having an open top end surface and a closed bottom end surface forming a base. Aligned in a row along an outer surface of the cylinder body and below where the horns are attached to the cylinder body are through holes that pass horizontally through opposing cylinder walls. A pair of horns are attached vertically to the surface of the cylinder body. The horns are positioned in line with a diameter of the cylinder body across from one another. The though holes are located in between the horns. A V-fin is attached to the base, wherein the V-fin is positioned centrally in line with the diameter of the cylinder body and perpendicular to the horns. The horns and V-fin include a mating surface and through holes.

18 Claims, 7 Drawing Sheets

(56) References Cited

U.S. PATENT DOCUMENTS

| | | | | |
|---|---|---|---|---|
| 5,148,641 | A * | 9/1992 | Rushing | G01C 15/04 52/165 |
| 5,156,110 | A * | 10/1992 | Fuller | G09F 17/00 248/912 |
| 5,230,187 | A * | 7/1993 | Reimann | E04G 13/00 248/156 |
| 5,238,321 | A * | 8/1993 | Jarjoura | E04H 12/2215 403/178 |
| 5,320,316 | A * | 6/1994 | Baker | F16M 11/36 248/163.1 |
| 5,425,452 | A * | 6/1995 | Shanks | A63B 55/20 206/315.7 |
| 5,492,430 | A * | 2/1996 | Jones | F16B 7/149 403/109.5 |
| 5,711,103 | A * | 1/1998 | Keng | F41A 23/08 89/37.04 |
| 5,887,835 | A * | 3/1999 | Hein | F16M 11/26 248/161 |
| 6,027,087 | A * | 2/2000 | Lindemann | F16M 13/04 248/188.5 |
| 6,031,170 | A * | 2/2000 | Hoshino | G10D 13/065 84/422.2 |
| 6,286,795 | B1 * | 9/2001 | Johnson | F16M 11/16 248/188 |
| 6,311,537 | B1 * | 11/2001 | Vigil | A62B 3/005 254/133 R |
| 6,502,321 | B1 * | 1/2003 | Crain | G01C 15/06 33/296 |
| 6,688,566 | B1 * | 2/2004 | Crain | G01C 15/00 248/168 |
| 7,124,985 | B2 * | 10/2006 | Crain | G01C 15/06 403/109.5 |
| 7,137,655 | B2 * | 11/2006 | Quarberg | E05C 19/004 248/351 |
| 7,207,534 | B2 * | 4/2007 | Crain | F16M 13/02 248/188 |
| 7,222,827 | B2 * | 5/2007 | Crain | F16M 11/28 403/321 |
| 7,581,703 | B1 * | 9/2009 | Coleman | F16M 11/34 248/188 |
| 7,604,207 | B2 * | 10/2009 | Hasloecher | F16M 11/34 16/34 |
| 7,631,455 | B2 * | 12/2009 | Keng | F41A 23/10 248/163.1 |
| 7,631,842 | B2 * | 12/2009 | Crain | F16M 11/10 248/176.1 |
| 7,823,855 | B2 * | 11/2010 | Faifer | F16M 11/26 248/188.5 |
| 7,954,272 | B2 * | 6/2011 | Potterfield | F41A 23/10 73/167 |
| 7,959,123 | B1 * | 6/2011 | Kitscha | F16M 11/32 248/188 |
| 8,292,240 | B2 * | 10/2012 | Hein | F16M 11/32 396/419 |
| 8,496,212 | B2 * | 7/2013 | Keng | F16M 11/245 248/168 |
| 8,534,620 | B2 * | 9/2013 | Zierer | F16M 11/36 248/163.1 |
| 8,714,426 | B2 * | 5/2014 | Bohurjak | H01Q 1/1235 224/655 |
| 9,228,695 | B2 * | 1/2016 | Cyr | F16M 11/36 |
| 9,303,940 | B2 * | 4/2016 | Bonelli | F16M 11/38 |
| 9,517,364 | B2 * | 12/2016 | Herwig | F16G 15/06 |
| 9,528,655 | B1 * | 12/2016 | Miles | A44B 13/0029 |
| D782,930 | S * | 4/2017 | Takakuwa | D8/394 |
| D787,871 | S * | 5/2017 | Roso | D6/710 |
| D788,951 | S * | 6/2017 | Lopez | D25/199 |
| 10,178,209 | B1 * | 1/2019 | Hesse | H04N 23/54 |
| 10,473,265 | B2 * | 11/2019 | Banes | A01M 31/02 |
| 10,794,531 | B2 * | 10/2020 | Murrow | F16M 11/36 |
| 10,876,591 | B2 * | 12/2020 | Mallin | F16F 9/5126 |
| 11,067,225 | B2 * | 7/2021 | He | F16M 13/04 |
| 11,524,620 | B2 * | 12/2022 | Hughes | B60P 7/0823 |
| 11,692,581 | B2 * | 7/2023 | Buczynski | F16B 37/043 411/103 |
| 11,971,648 | B2 * | 4/2024 | Jankura | F16M 11/32 |
| 12,071,972 | B2 * | 8/2024 | Ressler | E04H 15/322 |
| D1,049,879 | S * | 11/2024 | Wang | D10/46 |
| 12,158,235 | B2 * | 12/2024 | Johnson, Sr. | F16B 35/06 |
| D1,068,591 | S * | 4/2025 | Faifer | D12/178 |
| D1,111,805 | S * | 2/2026 | Twyman | D8/354 |
| D1,113,418 | S * | 2/2026 | Gebhardt | D8/366 |
| D1,114,046 | S * | 2/2026 | Hellsten | D16/243 |
| D1,114,604 | S * | 2/2026 | Luo | D8/367 |
| D1,114,872 | S * | 2/2026 | Lee | D14/372 |
| 12,551,034 | B2 * | 2/2026 | Glen | A01G 9/023 |
| 12,553,238 | B2 * | 2/2026 | Doucette | E04B 9/16 |
| 12,553,456 | B2 * | 2/2026 | Xie | A45F 5/02 |
| 12,553,459 | B2 * | 2/2026 | Lacy | F16B 7/185 |
| 12,554,115 | B2 * | 2/2026 | Chenderovitch | G02B 23/125 |
| 12,559,957 | B2 * | 2/2026 | Moose | A62B 35/0068 |
| D1,115,495 | S * | 3/2026 | Christ | D8/354 |
| D1,116,728 | S * | 3/2026 | Feng | D8/349 |
| 2003/0042388 | A1 * | 3/2003 | Peterson | F16M 13/06 D22/199 |
| 2005/0098381 | A1 * | 5/2005 | Flaherty | E04G 21/3276 182/3 |
| 2006/0102426 | A1 * | 5/2006 | Thompson | F16M 11/36 182/200 |
| 2006/0231694 | A1 * | 10/2006 | Crain | F16B 7/1463 248/121 |
| 2006/0278797 | A1 * | 12/2006 | Keng | F16M 11/26 248/440.1 |
| 2007/0290104 | A1 * | 12/2007 | Denison | F16M 11/36 248/188.8 |
| 2008/0061209 | A1 * | 3/2008 | Kantarovich | F16M 11/041 248/431 |
| 2008/0111036 | A1 * | 5/2008 | Cartoni | G03B 17/561 248/188.5 |
| 2011/0155886 | A1 * | 6/2011 | Nakaniwa | G01C 15/00 248/440.1 |
| 2016/0102469 | A1 * | 4/2016 | Borchardt | F16M 13/02 52/741.1 |
| 2017/0089515 | A1 * | 3/2017 | Snyder | E04H 12/22 |
| 2017/0234480 | A1 * | 8/2017 | Cedrone | E04H 12/2238 248/511 |
| 2019/0293233 | A1 * | 9/2019 | DeVoe | F16B 2/08 |
| 2019/0330867 | A1 * | 10/2019 | Walsh | E04G 21/3219 |
| 2020/0187478 | A1 * | 6/2020 | Williamson | A01K 97/10 |
| 2023/0189981 | A1 * | 6/2023 | McGraw | A47B 5/00 108/42 |
| 2023/0375127 | A1 * | 11/2023 | Johnson, Sr. | F16B 35/06 |
| 2024/0156222 | A1 * | 5/2024 | Yung | A45B 23/00 |
| 2025/0035259 | A1 * | 1/2025 | Xiao | F16M 11/28 |
| 2026/0050205 | A1 * | 2/2026 | Rohrbach | G03B 17/561 |
| 2026/0052332 | A1 * | 2/2026 | Smith | H04R 1/025 |
| 2026/0146705 | A1 * | 5/2026 | Roysum | F16M 11/36 |

* cited by examiner

KLING-ON TRIPOD MOUNTING DEVICE

FIELD OF THE DISCLOSURE

The present invention relates to a tripod mounting device. More specifically, the present invention is a device that secures a tripod to a structural support.

BACKGROUND OF THE INVENTION

Tripods are used as artificial high directionals and anchors in rigging activities, for example mountain and industrial rescue work, and confined space entry. A conventional industrial tripod has three legs permanently secured to a head. A directional is used in rigging activities which employ ropes. The directional may change the direction a rope is positioned or running. Often, in rigging activities, the rope is weighted, and the directional must have load bearing capacity, referred to as an anchor. A "natural" anchor, such as a tree, may not be positioned to provide an efficient attachment point for ropes during a rescue. An "artificial" anchor, such as a tripod may serve as a directional anchor, allowing the ropes to be efficiently employed.

Though the tripod provides an "artificial" anchor, the tripod itself must be secured. Often the location in which the tripod is to be set up does not provide a means for properly securing the tripod. In these instances the tripod is lashed to an artificial structure such as a railing, an I-beam, or some form of structure for support. An objective of the present invention is to provide a device that allows a rescue technician to securely lash a leg of a tripod to a structural support such as railing, or a I-beam etc.

SUMMARY OF THE INVENTION

The present invention is tripod mounting device that provides a means to lash a tripod to a structural support, the structural support having a variety of shapes. The present invention includes a V-shaped base to cradle a structural support member and two "horns" which provide a secure place to wrap a rope, or cord for lashing the device securely to the structural support.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

All illustrations of the drawings are for the purpose of describing selected versions of the present invention and are not intended to limit the scope of the present invention.

DETAILED DESCRIPTION

In the Summary of the Invention above, in this Detailed Description, in the Claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

The term "comprises", and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "dorsal" refers to positions that are located near, on, or towards the upper or top side of a structure.

Figure 1:
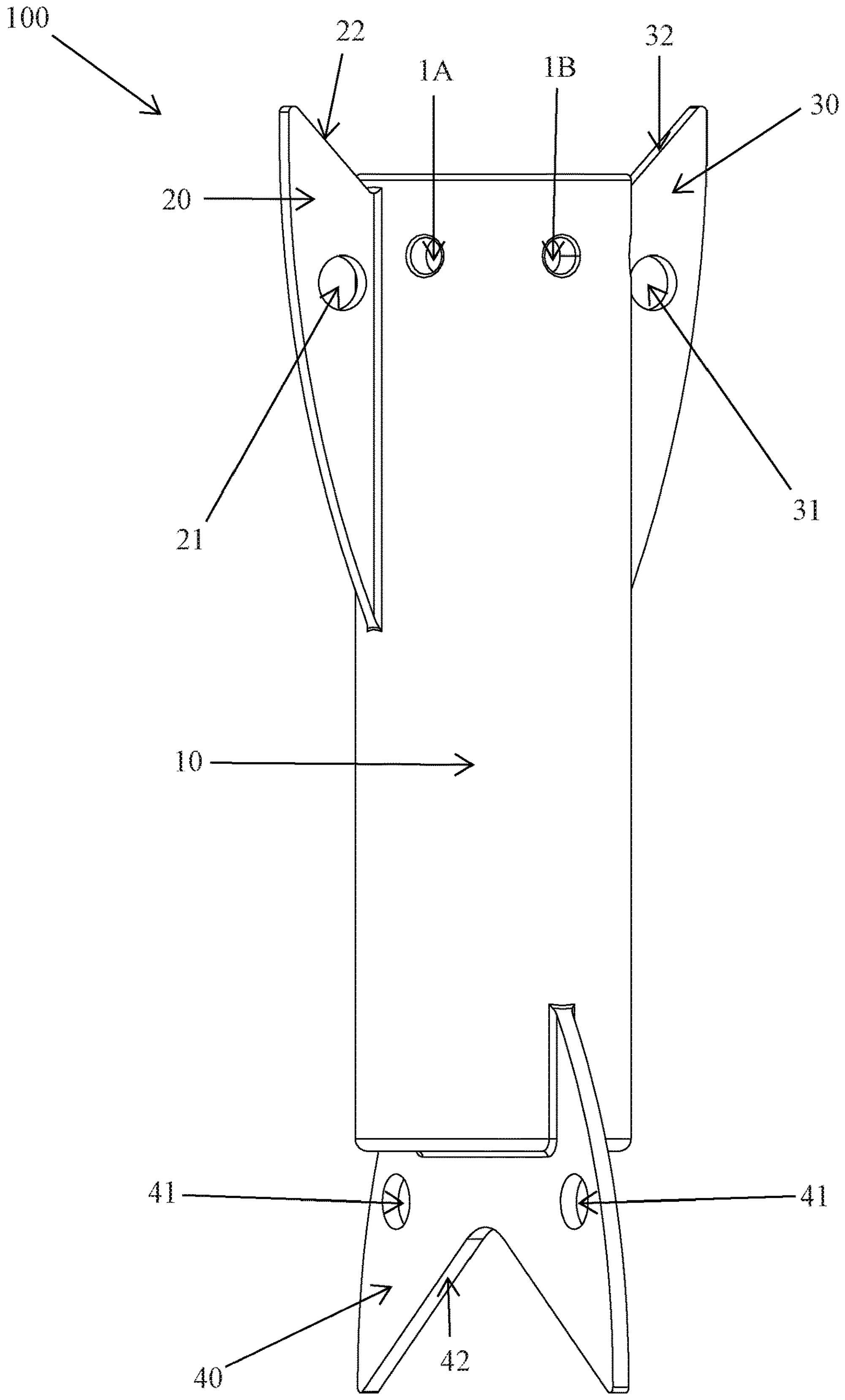
FIG. 1 is a perspective view of the present invention.

The present description includes one or more non-limiting embodiments of the present invention, a tripod mounting device Kling-on 100. Referring to FIG. 1, FIG. 1 is a perspective view of the device Kling-on 100. The present invention is comprised of a cylinder body 10, wherein the cylinder body 10 has a top surface 3 (displayed in FIG. 2), a bottom surface forming a base 4 (displayed in FIG. 4), and an open center area 2 (displayed in FIG. 2) within the top surface 3. A leg of a tripod is inserted into the open center area 2. Located near the top surface 3 are pinning holes 1A, 1B, and 1C (displayed in FIG. 3). Pinning holes 1A, 1B, and 1C are through holes aligned in a row along an outer surface of the cylinder body 10. The through holes extend horizontal through the cylinder body 10. Pinning hole 1B is centrally located on an outer surface of the body 10, pinning hole 1A is positioned to the left of pinning hole 1B, and pinning hole 1C is positioned to the right of pinning hole 1B. The pinning holes 1A, 1B, and 1C allow for a pin to be inserted through the cylinder body 10 and the leg of the tripod, wherein the pin is a means to secure the device to the leg of the tripod.

Attached to the outer surface of the cylinder body are a left side horn 20, and a right side horn 30. Horns 20 and 30 include surfaces 22 and 32, and through holes 21 and 31 respectively. Once the present invention is pinned to the leg of the tripod, a rope is used to lash the present invention to a structure support. The rope is wrapped over the horn surfaces 22 and 32, and vertically down towards the base 4, along the cylinder body 10 to the support structure to secure the present invention to the structure. Additionally, the rope can be passed through the through holes 21 and 31. Once the present invention has been secured to the support structure, the rope is wrapped horizontally around the cylinder body 10 starting from below the base of the attachment of the horns 20 and 30 down towards the base 4. The horizontal wrapping provides binding compression and secures the vertical wrapping along the cylinder body 10.

Attached to the base 4 of the cylinder body is a V-fin 40. The V-fin 40 includes a mating surface 42 (displayed in FIG. 3) and through holes 41 (displayed in FIG. 3). The V-fin 40 is utilized to capture the structural support the present invention is to be secured to, wherein the mating surface 42 contacts a surface of the structural support. After the horizontal wrapping, the remaining end of the rope is passed through the through holes 41 before tying down the presenting invention and securing it to the structural support.

Figure 2:
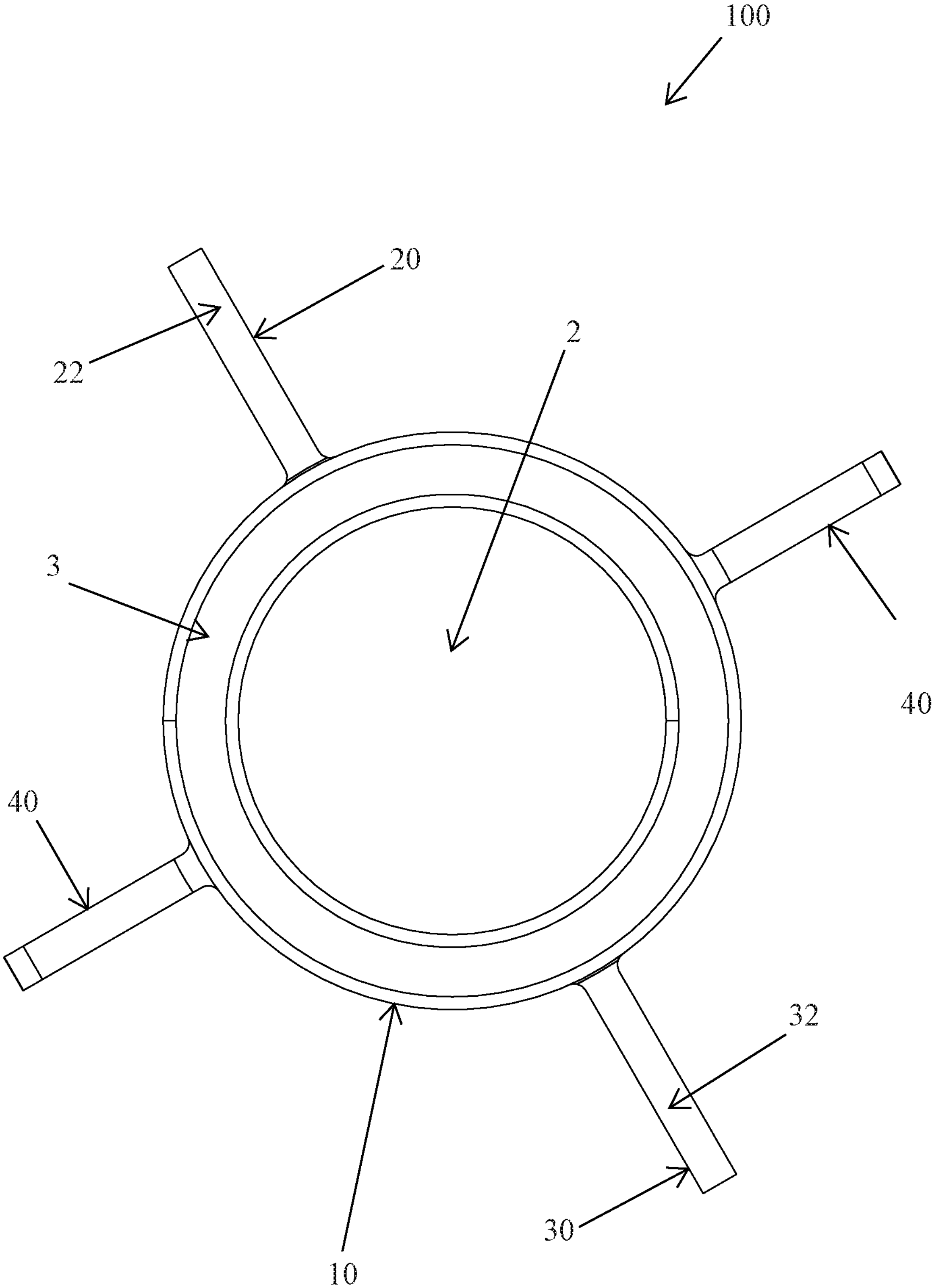
FIG. 2 is a top view of the present invention.

Referring to FIG. 2, FIG. 2 is a top view of the present invention Kling-On 100. The cylinder body 10 has an open inner area 2 centered within the top surface 3, wherein a leg of the tripod is inserted into the cylinder body 10. A pin is inserted through one set of through holes 1A, 1B, or 1C to secure the leg of the tripod within the present invention. Displayed are the horn surfaces 22 and 32 of horns 20 and 30 respectively.

Figure 3:
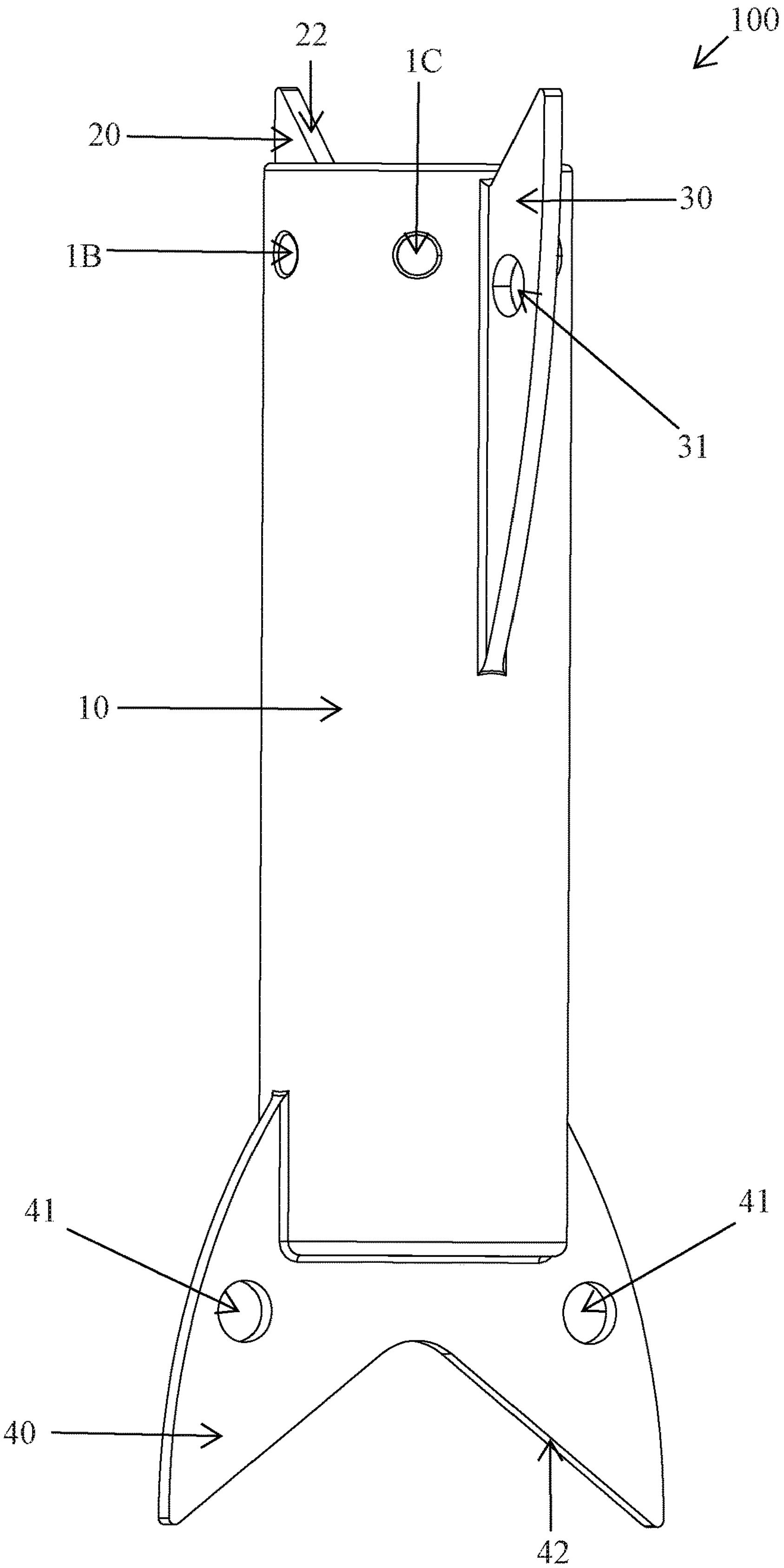
FIG. 3 is a right-side view of the present invention.

Referring to FIG. 3, FIG. 3 is a right-side view of the present invention Kling-On 100. Displayed is the position of through hole 1C in relationship to through hole 1B, as well as horn surface 22 and mating 42.

Figure 4:
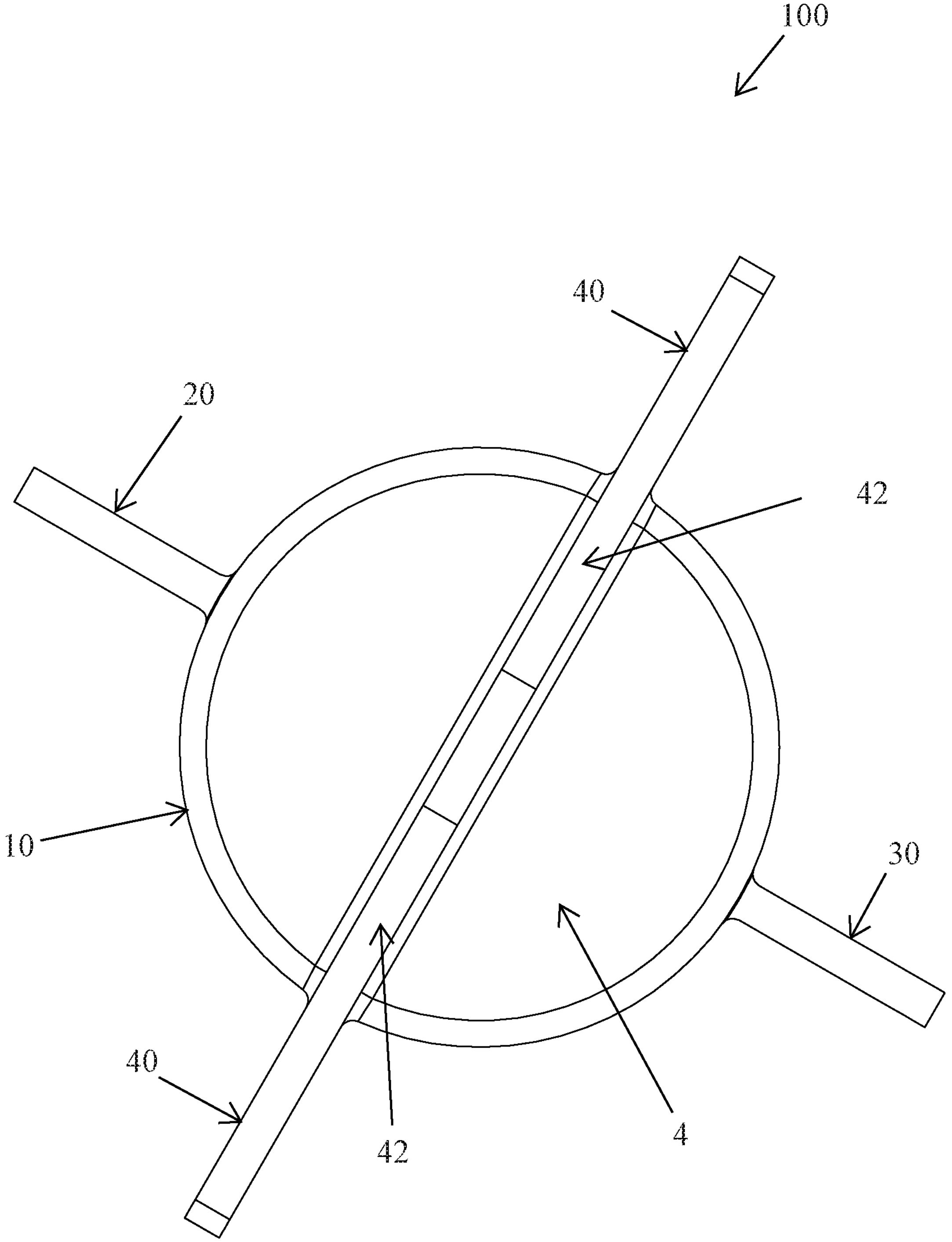
FIG. 4 is a bottom view of the present invention.

Referring to FIG. 4, FIG. 4 is a bottom view of the present invention Kling-On. Displayed is the V-fin 40 attached to base 4 of the cylinder body 10, wherein the V-fin 40 is aligned centrally along the diameter of the cylinder body 10 and perpendicular to horn 20 and horn 30.

Figure 5:
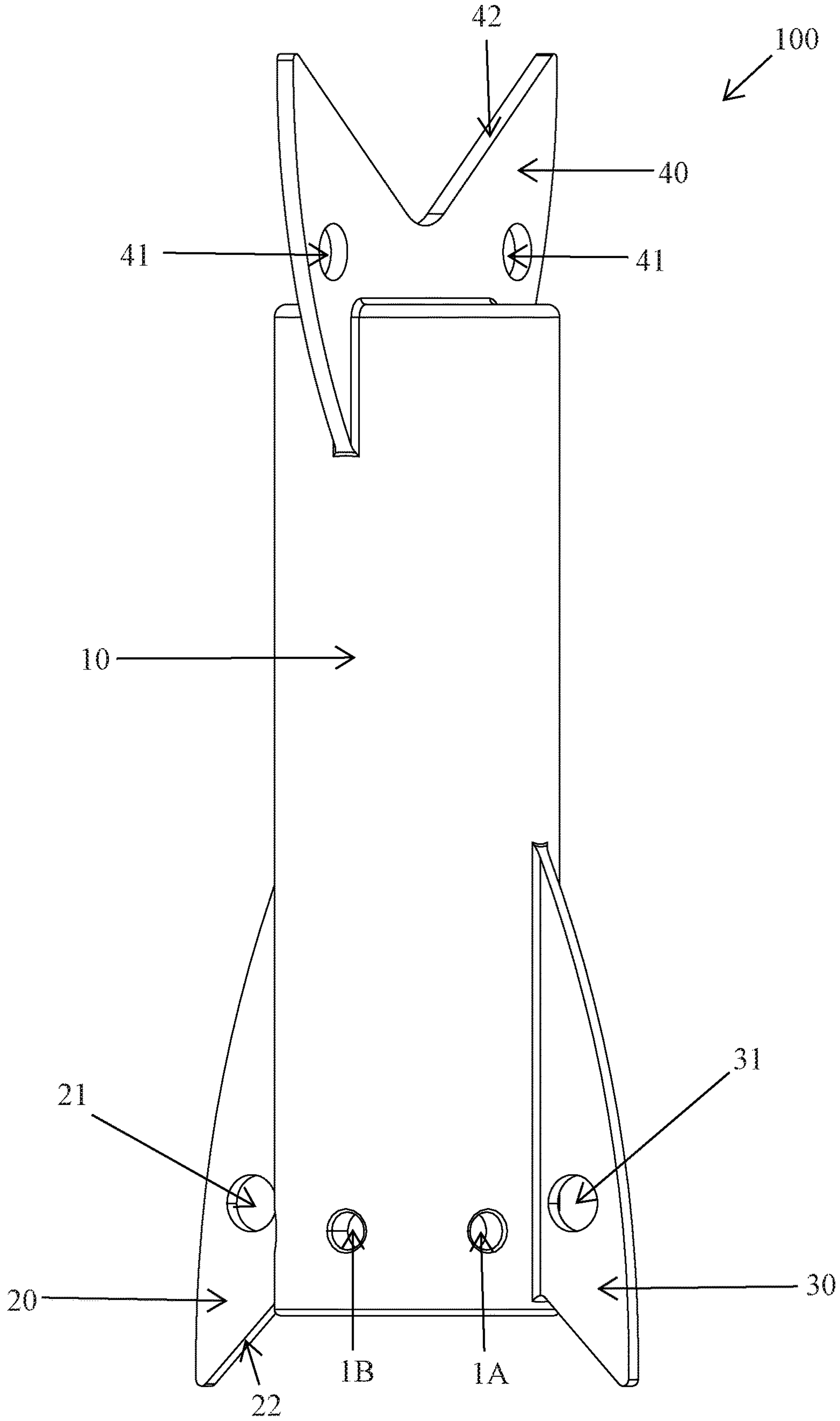
FIG. 5 is a right-side view from the bottom to the top of the present invention.

Referring to FIG. 5, FIG. 5 is a side view from the bottom to the top of the present invention Kling-On 100. Displayed is the position of through hole 1A with respect to through hole 1B, as well as horn surfaces 22 and V-fin mating surface 42.

Figure 6:
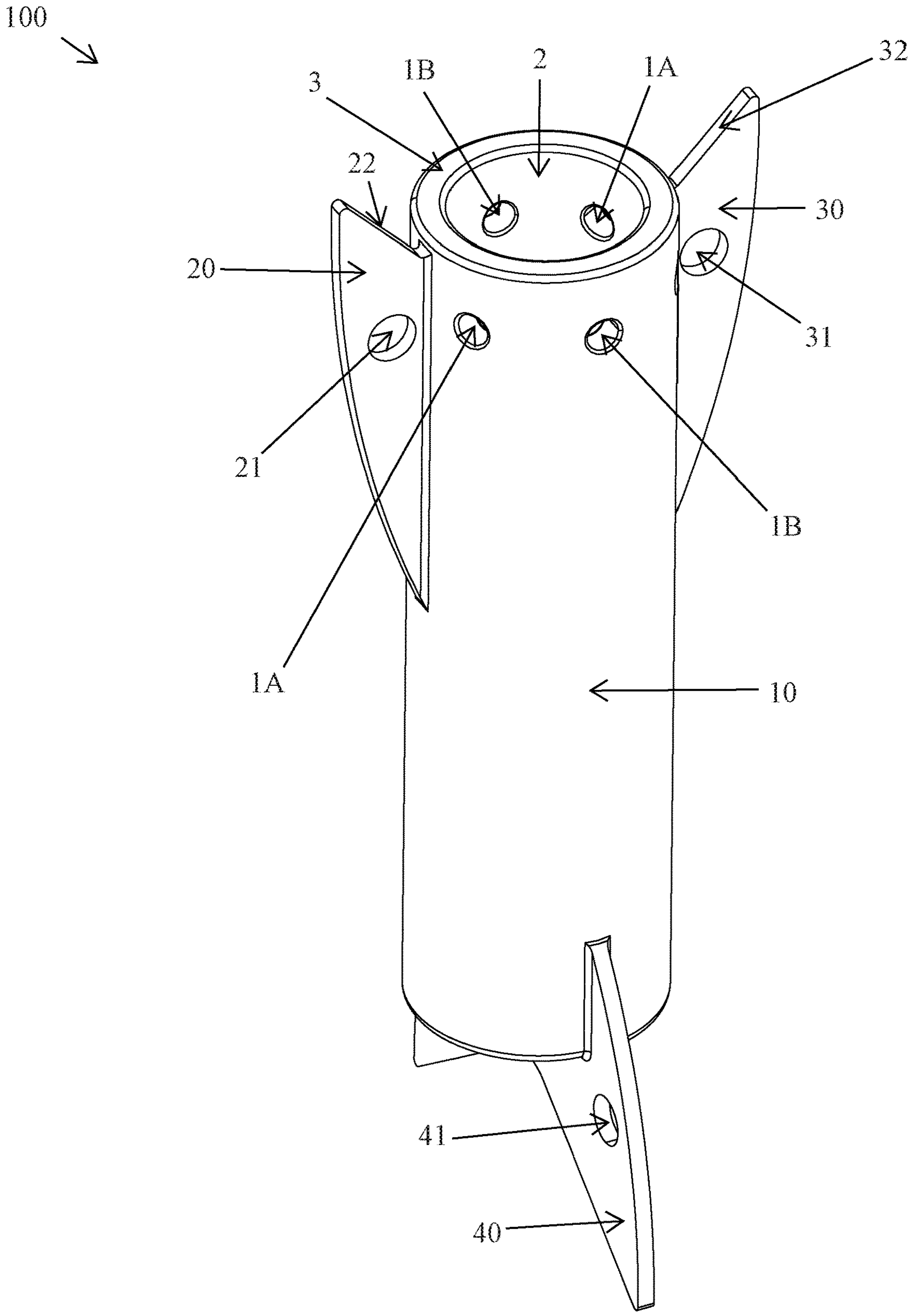
FIG. 6 is a perspective view from a top angle of the present invention.
Figure 7:
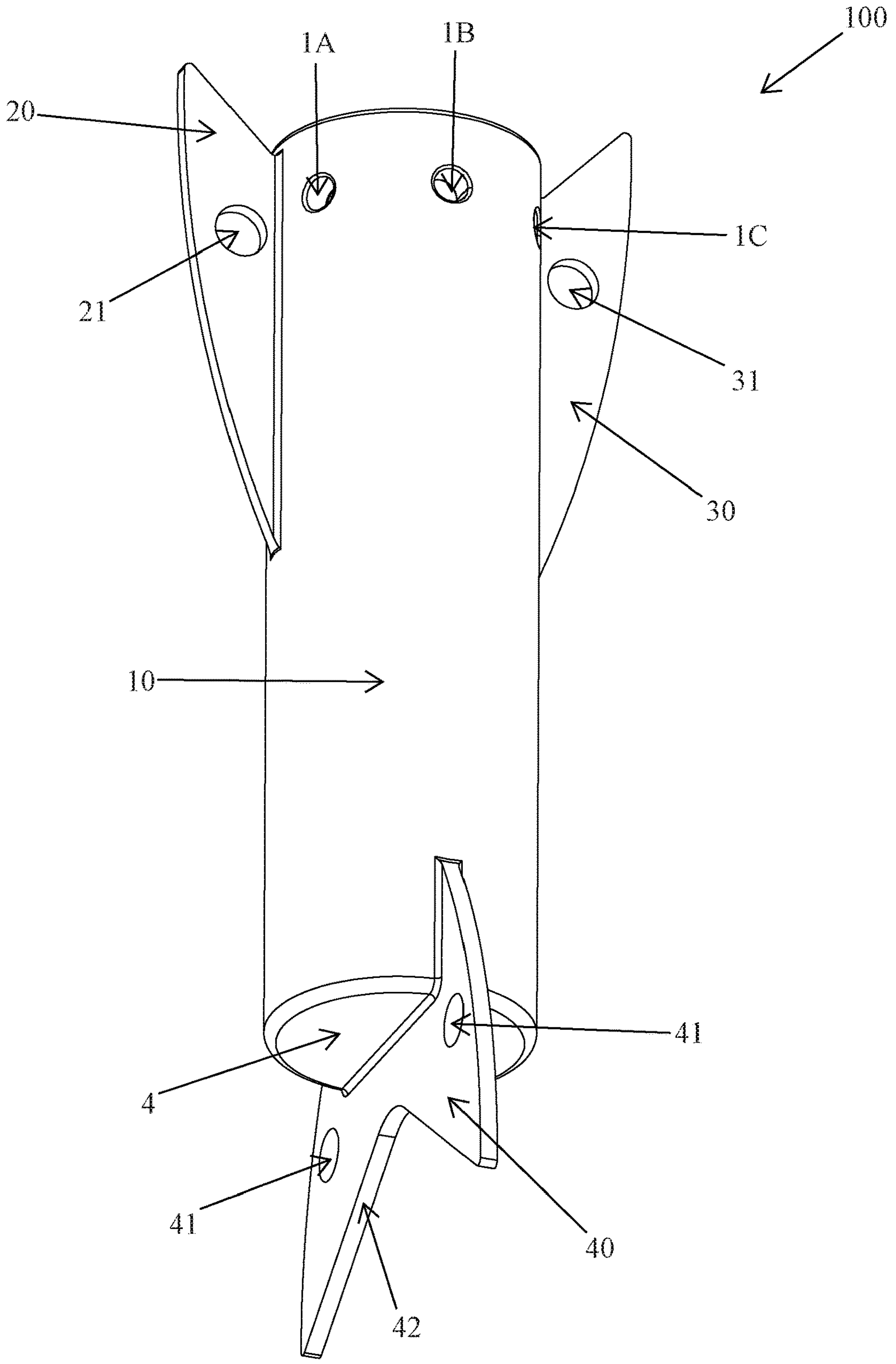
FIG. 7 is a perspective view from a bottom angle of the present invention.

Referring to FIGS. 6 and 7, FIG. 6 is a perspective view from a top angle, and FIG. 7 is a perspective view from a bottom angle of the present invention Kling-On 100 further displaying the positioning of through holes 1A, 1B, and 1C with relationship to each other, as well as horn surface 22 (displayed on FIG. 6), horn surface 32 (displayed on FIG. 6), and V-fin mating surface 42 (displayed on FIG. 7).

The present invention is a tripod mounting device Kling-On. The present invention is utilized to secure a tripod to a structural support such as a pole, a railing, or a I-beam. The present invention is comprised of rigid metal material such as steel. The present invention consists of a cylinder body of a predefined length, wherein the cylinder body has an open top end surface and a closed end bottom surface. The bottom surface forms a base of the cylinder body. The cylinder body has a cylinder wall of a predefined a wall thickness, wherein there is an outer surface and an inner surface. A leg of the tripod is inserted into a central open area of the top surface, wherein a surface of the tripod leg mates with the inner surface of the cylinder body. Located near the top surface are pinning holes. The pinning holes are through holes aligned in a row along the outer surface of the cylinder body. The through holes extend horizontal through the cylinder body from one cylinder wall to the opposing cylinder wall. The pinning holes allow for a pin to be inserted through the cylinder body and the tripod leg, wherein the pin is a means to secure the present invention to the leg of a tripod. In a preferred embodiment of the present invention there are three sets of pinning holes aligned along the outer surface of the cylinder body.

Attached to the outer surface of the cylinder body are a pair of horns. The horns are comprised of a metal material similar to the cylinder body. A first horn is attached to the outer surface of the cylinder body to be a left side horn, and a second horn is attached to the outer surface of the cylinder body to be a right side horn. The attached horns are positioned vertically across from each other and are in line with a diameter of the cylinder body. The pinning holes are positioned in between the left side horn and the right side horn. Each horn includes a wrapping surface located towards the top end of the cylinder body, and a through hole. When the present invention is lashed to the support structure a rope is wrapped over the wrapping surface of the horns vertically in line with the cylinder body, and to the structural support. Additionally, the rope can be passed through the through hole of each of the respective horns. In a preferred embodiment the horns are welded to the outer surface of the cylinder body.

Attached to the base of the cylinder body is a V-fin. The V-fin is a single piece component comprised of a metal material similar to the cylinder body and horns. The attached V-fin is positioned centrally in line with the diameter of the cylinder body and perpendicular to the attached horns. The V-fin includes a mating surface located away from the base of the cylinder body, and a set of through holes. The mating surface contacts the surface of the structural support the present invention is to be secured to, wherein the V shape of the V-fin allows the present invention to mate with a structure having a variety shapes. When the present invention is lashed to the structural support, the rope is first wrapped over the wrapping surface of the horns and structural support vertically, and then the rope is wrapped horizontally over the vertical wrapping and the cylinder body starting from below the attachment of the horn to the cylinder body down to the bottom end base, wherein the rope is passed through the through holes of the V-fin to tie of the rope, securing the present invention to the structural support. The horizontal wrapping provides a binding compression and secures the vertical wrapping along the cylinder body. In a preferred embodiment the V-fin is welded to the base of the cylinder body.

Although the invention has been explained in relation to its preferred embodiment, it is to be understood that many other possible modifications and variations can be made without departing from the spirit and scope of the invention.

What is claimed is:

1. A tripod support device comprising:

a cylinder body;

a pair of horns;

a V-fin;

wherein:

the cylinder body comprises an open top end surface and a closed bottom end;

the closed bottom end forms a base;

the pair of horns are attached vertically to an outer surface of the cylinder body;

the pair of horns extend radially outward from the outer surface of the cylinder body;

the pair of horns extend upwardly such that a topmost point of each horn is offset above the cylinder body;

the V-fin and the pair of horns are coaxially arranged such that the V-fin is circumferentially offset from the pair of horns; and the V-fin is attached to the base of the cylinder body.

2. The tripod support device as claimed in claim 1, wherein the cylinder body is of a predefined length; and the cylinder body has a cylinder wall, wherein the cylinder wall is of a predefined wall thickness.

3. The tripod support device as claimed in claim 1, wherein the cylinder body includes at least one through hole aligned along the outer surface of the cylinder body below the top end surface.

4. The tripod support device as claimed in claim 3, wherein the at least one through holes passes through the cylinder wall.

5. The tripod support device as claimed in claim 3, wherein the through holes are aligned in a horizontal row.

6. The tripod support device as claimed in claim 1, wherein a first attached horn is a left side horn and a second attached horn is a right side horn, wherein the left side horn is position opposite and across from the right side horn.

7. The tripod support device as claimed in claim 6, wherein the left side horn and the right side horn are positioned in line with a diameter of the cylinder body.

8. The tripod support device as claimed in claim 6, wherein the left side horn includes a mating surface and a through hole.

9. The tripod support device as claimed in claim 6, wherein the right side horn includes a mating surface and a through hole.

10. The tripod support device as claimed in claim 1, wherein the V-fin is diametrically positioned on the base the cylinder body and extends downwards such that a pair of bottom most points of the V-fin are lower than the base of the cylinder body.

11. The tripod support device as claimed in claim 10, wherein the V-fin includes a mating surface and a pair of through holes.

12. A tripod support device comprising:

a cylinder body;

a pair of horns; and a V-fin;

wherein:

the cylinder body comprises a cylinder wall and a predefined length wherein the cylinder wall comprises a predefined wall thickness;

the cylinder body comprises an open top end surface and a closed bottom end forming a base;

the pair of horns is attached vertically to an outer surface of the cylinder body; and the pair of horns extend radially outward from the outer surface of the cylinder body;

the pair of horns extend upwardly such that a topmost point of each horn is offset above the cylinder body;

each horn of the pair of horns is symmetric and positioned diametrically opposed to each other along the cylinder body:

the V-fin and the pair of horns are coaxially arranged such that the V-fin is circumferentially offset from the pair of horns; and the V-fin attached to the base of the cylinder body.

13. The tripod support device as claimed in claim 12, wherein the cylinder body includes at least one through hole aligned along the outer surface of the cylinder body below the top end surface; and the though holes aligned horizontally in row.

14. The tripod support device as claimed in claim 13, wherein the through hole passes through the cylinder wall.

15. The tripod support device as claimed in claim 12, wherein a first attached horn is a left side horn and a second attached horn is a right side horn; and the left side horn includes a mating surface and a through hole.

16. The tripod support device as claimed in claim 15, wherein the right side horn includes a mating surface and a through hole.

17. The tripod support device as claimed in claim 12, wherein the V-fin is positioned on the base centrally along a diameter of the cylinder body and perpendicular to the pair of horns.

18. The tripod support device as claimed in claim 17, wherein the V-fin includes a mating surface and a pair of through holes.

* * * * *